Dec. 2, 1969  J. R. PALMA  3,481,500

VALVE

Filed March 22, 1968  2 Sheets-Sheet 1

INVENTOR.
JAMES R. PALMA.

BY
John H. Oltman

Dec. 2, 1969   J. R. PALMA   3,481,500
VALVE

Filed March 22, 1968   2 Sheets-Sheet 2

INVENTOR.
JAMES R. PALMA.
BY
John H. Oltman

United States Patent Office 3,481,500
Patented Dec. 2, 1969

3,481,500
VALVE
James R. Palma, 1502 Curry Road,
Schenectady, N.Y. 12306
Filed Mar. 22, 1968, Ser. No. 715,381
Int. Cl. A61j 11/02, 11/04
U.S. Cl. 215—11                    14 Claims

ABSTRACT OF THE DISCLOSURE

A valve for containers including a hollow stem portion and a flange portion having (1) at least one opening through a region thereof between the stem portion and and the edge of the flange portion, (2) a sealing region radially outward from the opening, and (3) a valve lip radially inward from the opening. A clamp is used with the valve, and one or more flexible bags may also be used.

Background of the invention

When a baby sucks on a conventional nipple applied to a nursing bottle to take liquid from the bottle, air cannot get into the bottle while the baby sucks, so pressure in the bottle is reduced making it progressively more difficult to take liquid. As a consequence, the baby swallows air which leads to gas discomfort. In this and other applications, there is a need for a valve to equalize pressure in the bottle.

Summary of the invention

The present invention provides a valve having a built-in lip which allows air to enter a bottle while liquid flow out of it in order to equalize pressure. The valve may be in the form of a nipple, and when the nipple is applied to a nursing bottle, vacuum does not build up in the bottle and there is less tendency for the baby to swallow air. The lip is on a flange portion of the nipple, and the lip sealingly contacts a clamp which secures the nipple to the bottle. There is an opening through the nipple's flange outside the lip. The lip preferably bends radially outwardly so that liquid cannot leak past the lip. However, when pressure is reduced in the bottle, as during nursing, the lip yields to allow air to enter the bottle through the opening. The same structure can be used to provide a valve for an intravenous feeding bottle, and flexible bags may also be used with this structure.

Accordingly, it is an object of the present invention to provide an improved nipple which acts as a falve for equalizing pressure in a nursing bottle.

Another object of the invention is to provide a valve and a clamp which are applied to a container and cooperate to accomplish a valving function for equalizing pressure in the container with ambient pressure.

A further object of the invention is to provide a valve with an apertured hollow portion and a flange portion having at least one opening therein and also having a valve lip radially inward from the opening and surrounding the hollow portion of the valve, the lip contacting a clamp which secures the valve to a bottle to prevent leakage of liquid around the lip but allowing air to enter the bottle through the opening.

Another object of the invention is to provide a valve as described in the last preceding paragraph cooperating with at least one flexible bag, the valve and the bag both being held to the bottle with a clamp. Another bag may be held to the valve to provide a bag within a bag.

Other objects of this invention will appear in the following description and appended claims, reference being had to the accompanying drawings forming a part of the specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
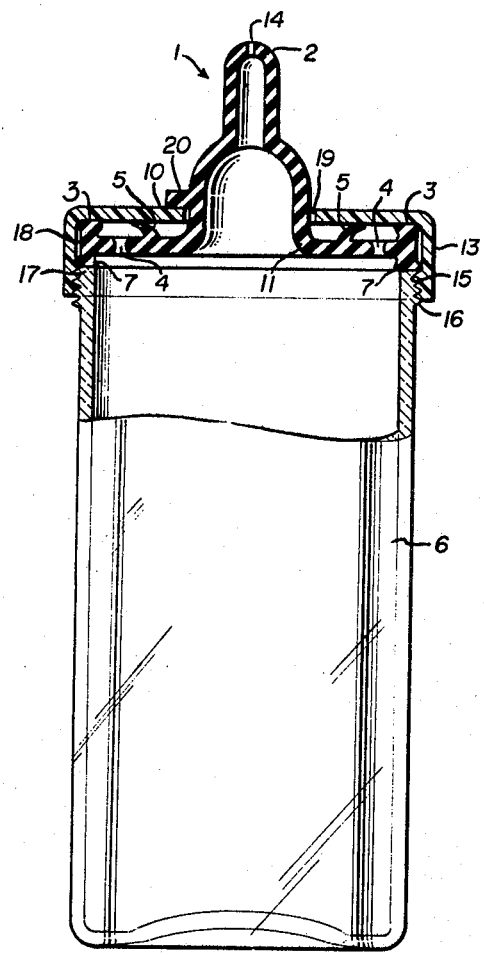
FIGURE 1 is a vertical sectional view of a nursing bottle, a clamp and a nipple with a valve lip, all assembled together.
Figure 2:
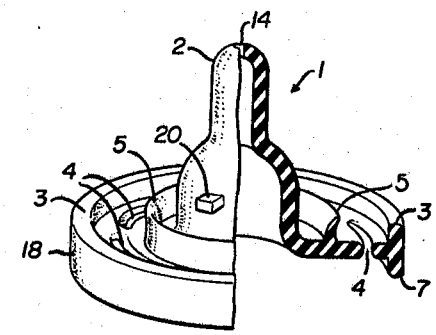
FIGURE 2 is a fragmentary perspective view of the nipple with a portion thereof cut away.
Figure 3:
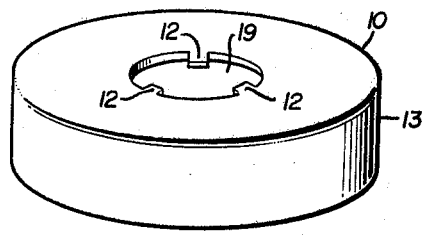
FIGURE 3 is a perspective view of a clamp included in FIGURE 1.

As shown on the drawings:

Referring first to FIGURES 1-3, nipple 1 of rubber or other suitable resilient flexible material is secured to the top of a nursing bottle 6 of glass or plastic and is held in place by a clamp 10. The nipple 1 includes a hollow bulbous stem portion 2 which is closed at its top end except for a small aperture 14, and which is open at its bottom end. The nipple also includes a flange portion 11 extending radially from the bottom end of stem portion 2 and terminating in a circular edge 18. At edge 18 is a sealing lip 3 which projects upwardly from the main body of flange 11 in the same direction as the stem portion 2 extends. There may also be a protrusion 7 extending downwardly from flange 11, but this is not essential.

Spaced inwardly from lip 3 are a series of oval openings 4 extending through flange 11 and spaced angularly about the stem portion 2 of the nipple. Only one such opening is essential, but it is preferred to provide several openings 4 through the flange.

Spaced radially inward from the openings 4 is a circular valve lip 5 integral with flange 11 and extending about stem portion 2. Valve lip 5 is relatively thin and flexible and preferably is more flexible than sealing lip 3. Valve lip 5 curves outwardly away from bulb portion 2 to aid in making a seal as will be described.

A clamp ring 10 is used to clamp the nipple 1 to the bottle 6. Clamp ring 10 has a central hole 19 extending through it, and has a plurality of lugs 12 projecting into the opening to provide spacers for contracting stem portion 2 of the nipple. Clamp ring 10 has a downwardly turned skirt 13 about its periphery, and skirt 13 is internally threaded at 15 so that it can be screwed on to threads 16 provided on the mouth portion 17 of the bottle 6. Nipple 1 has lugs 20 which bear against the top of clamp ring 10 to hold stem portion 2 in place.

The clamp 10, nipple 1 and bottle 6 are assembled as shown in FIGURE 1. The circular protrusion 7 seats on the top surface of the mouth 17 of the bottle. Clamp ring 10 is assembled over the flange portion 11 of the nipple and the stem portion 2 of the nipple projects through the central hole 19 of the clamp. The side of stem portion 2 contacts spacer lugs 12 to provide a space between the stem portion and the ring through which air can pass. Lugs 20 are forced through opening 19, and they are longer than lugs 12 so that they overlie the top surface of clamp 10 and hold lip 5 against the underside of clamp 10.

When clamp ring 10 is screwed onto the threads 16 of the bottle, the inner surface of the clamp ring bears down against sealing lip 3 of the nipple and compresses lip 3 and protrusion 7 to provide a tight seal between the nipple and the clamp ring and also between the nipple and the bottle. The valve lip 3 bears against the clamp ring 10 and is bent outwardly away from bulb portion 2. It may be seen that there is a passageway between clamp ring 10 and the nipple leading to openings 4, but this passageway is blocked by the valve lip 5 which is normally sealed against the clamp ring 10. Thus, when liquid is provided in the bottle, and the bottle is inverted for nursing a baby, the liquid will not leak past valve lip 5.

When the baby takes liquid from the bottle by sucking on the nipple, pressure is reduced in the bottle. Thus, there is a "forward" pressure differential on opposite sides of the valve lip 5. Atmospheric pressure being higher than pressure inside of the bottle causes the valve lip 5 to yield so that air can pass lip 5 and enter the bottle through openings 4, thus equalizing pressure inside the bottle with atmospheric pressure. The valve lip 5 may taper inwardly from its base portion to its tip to insure that the tip will be quite flexible and will yield when there is a forward pressure differential on opposite sides of it. Lip 5 does not yield if a reverse pressure differential should arise because it is bent outwardly.

Figure 4:
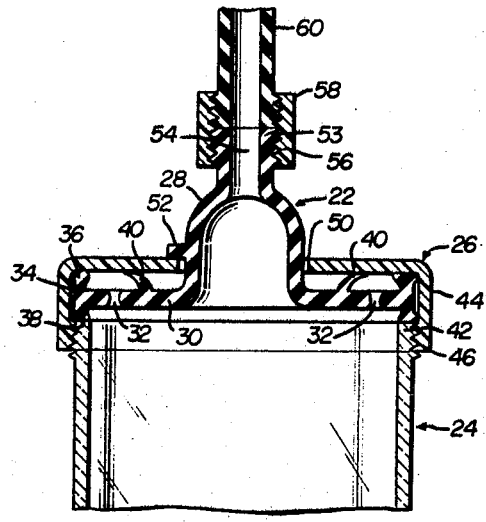
FIGURE 4 is a sectional view of an intravenous feeding bottle provided with a valve like the nipple of FIGURE 1-3.

FIGURE 4 illustrates another embodiment of the invention including a valve 22 applied to bottle 24 which may be used for intravenous feeding, the valve being held on the bottle by a clamp ring 26. Valve 22 is very similar to the valve 1 described previously. It includes a hollow stem portion 28 and a flange portion 30 extending radially from the base of the stem portion. Flange portion 30 has a plurality of openings 32 extending therethrough, a sealing region 34 at the edge thereof including an upwardly extending lip 36 and a downwardly extending protrusion 38, and a valve lip 40 encircling stem portion 28 and spaced radially inwardly from openings 32. Protrusion 38 seats on the top edge 42 of bottle 24. Clamp ring 26 has a downwardly extending skirt 44 which screws on to the threads 46 at the top of the bottle. Clamp ring 44 engages sealing lip 36 and presses protrusion 38 against the top of the bottle to seal the edge of the flange.

Valve lip 40 bends radially outwardly and engages clamp ring 26 to form a yieldable seal. Stem portion 28 extends freely through central opening 50 in clamp ring 26 leaving a small space or passage to allow air to enter the bottle. A protrusion or lug 52 extends from stem portion 28 and engages the top of clamp ring 26 to hold the sealing lip 40 against clamp ring 26.

As thus far described, it may be seen that valve 22 is identical to valve 1 of FIGURES 1–3. The difference is that the top end 53 of valve 22 has a larger opening 54 through which liquid can flow freely. The outside of end portion 53 has threads 56. A coupling ring 58 has internal threads and is screwed on to the threads 56 of valve 22. A flexible tube 60 is screwed into coupling ring 58. Both the valve 22 and tube 60 may be made of flexible rubber, whereas coupling ring 58 may be made of a relatively rigid plastic. Clamp ring 26 is made of rigid plastic, and bottle 24 is made of glass in the particular example illustrated in the drawings.

In use, liquid to be fed to a patient intravenously is provided in bottle 24. Valve 22, clamp ring 26, coupling ring 58 and tube 60 are connected as shown in FIGURE 4. The bottle and other elements are inverted to allow intravenous feeding of a patient. Liquid flows out through opening 54 into tube 60, and as it flows, pressure is reduced inside the bottle. The higher pressure outside the bottle pushes valve lip 40 away from clamp ring 26 so that air passes lip 40 and enters the bottle through openings 32 to equalize the pressure therein. Thus, there is no interruption of flow of the liquid.

Figure 5:
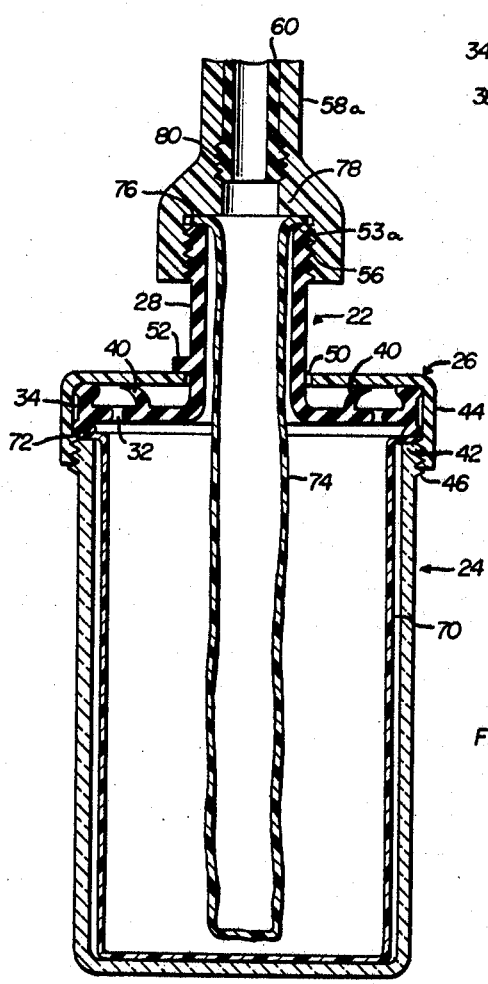
FIGURE 5 is a view similar to FIGURE 4 showing flexible bags used together with the valve.

FIGURE 5 shows a valve 22 applied to a bottle 24 by means of a clamp ring 26, all substantially identical to the corresponding elements of FIGURE 4, so the description of these elements will not be repeated. The top end 53a of valve 22 is not reduced in diameter like end 53 of valve 22 in FIGURE 4, but otherwise the construction is the same.

In FIGURE 5, a flexible plastic bag 70 is provided inside bottle 24 with its mouth 72 clamped to the top end 42 of bottle 24 under the edge 34 of valve 22.

A second flexible plastic bag 74 is provided inside bottle 24 and also inside stem portion 28 of valve 22. The mouth 76 of bag 74 is clamped to the top end 53a of valve 22 by a shoulder 78 on the clamping ring 58a. Clamping ring 58a is internally threaded at its bottom end and screws on to threads 56 at the top end 53a of valve 22. Flexible tube 60 is externally threaded at 80 and screws into matching threads provided inside coupling ring 58a.

A liquid to be fed intravenously to a patient is provided in the inner bag 74. A carbonated liquid is provided inside the outer bag 70. The bottle and other elements are inverted for feeding a patient. As liquid flows out of inner bag 74, any reduction in pressure inside bag 70 is equalized by flow of air past valve lip 40 through openings 32 into bag 70. Additionally, carbonation can escape from the liquid in bag 70 to increase pressure within bag 70. Thus, there are two ways to keep pressure inside bag 70 at least as high as atmospheric pressure to insure a steady flow of liquid from bag 74. The outer bag 70 keeps bottle 24 from becoming contaminated, and the inner bag 74 separates the carbonated liquid from the liquid to be fed intravenously.

It may be noted that bag 74 could be omitted and the intravenous feeding liquid could then be provided in bag 70, no carbonated liquid being used. Similarly, bag 70 could be omitted instead of bag 74, and the intravenous feeding liquid can be provided in bag 74 with no carbonated liquid being used.

It is apparent from the foregoing description that the invention provides an improved valve which permits air to enter a container to equalize pressure therein, but which prevents flow of liquid or air out of the container. The valve may be molded in one piece, and may be secured to a container by a simple clamp. The valve has different uses as described herein and can be manufactured economically on a large scale production basis.

Having thus described my invention, I claim:

1. A valve for use with a container having a mouth and a clamp for clamping the valve to the mouth, said valve comprising a one-piece member of resiliently flexible material having a hollow stem portion and a flange portion extending radially from one end of said stem portion and terminating in a circumferential edge, said flange portion having (1) at least one opening through a region thereof between said stem portion and said edge, (2) a sealing region radially outward from said opening adapted to be clamped to the mouth of the container by said clamp, and (3) a valve lip radially inward from said opening surrounding said stem portion and projecting in the same direction as said stem portion to engage said clamp, said valve lip being sufficiently flexible to yield when a pressure differential exists across the same.

2. A valve as claimed in claim 1 in which said valve lip curves upwardly and radially outwardly.

3. A valve as claimed in claim 1 in which said stem portion has at least one lug projecting therefrom to engage a top surface of said clamp to hold said lip against an undersurface of said clamp with said stem portion projecting through an opening in said clamp.

4. A valve as claimed in claim 1 in which said sealing region is also in the form of a lip projecting in the same direction as said stem portion and surrounding said stem portion.

5. A valve as claimed in claim 4 in which said valve lip is more flexible than said sealing lip.

6. A valve as claimed in claim 1 in which said stem portion is bulbous and has an aperture therein so that said valve serves as a nipple for a nursing bottle.

7. A valve as claimed in claim 1 in which said stem portion has an open free end adapted to be connected to a tube so that said valve may be utilized with an intravenous bottle.

8. In combination with a container having a mouth and an annular clamp removably affixed to said mouth and having a central hole therein, a valve comprising a one-piece member of resiliently flexible material having a hollow stem portion projecting from under said clamp through said hole, and a flange portion extending radially under said clamp and clamped sealingly by said clamp to said mouth, said flange portion having an opening through the same and a lip inwardly of said opening engaging said clamp all around said stem portion, said lip being yieldable when pressure in said container is reduced to allow air to enter through said hole, past said lip and through said opening into said container.

9. The combination as claimed in claim 8 in which said stem portion has at least one projection thereon overlying said clamp to hold said lip against said clamp.

10. The combination as claimed in claim 9 in which said clamp has lugs projecting into said hole for spacing said stem portion from said clamp for providing a clear passage for air to pass through said hole.

11. The combination as claimed in claim 8 wherein said lip bends radially outwardly from said stem portion.

12. The combination as claimed in claim 8 further including a flexible bag inside said container and clamped to the mouth of said bottle by said clamp.

13. The combination as claimed in claim 8 further including a flexible bag inside said container and said stem portion and connected to a top end of said stem portion.

14. The combination as claimed in claim 13 further including another flexible bag outside said first-named bag but inside said container and clamped to the mouth of said container by said clamp.

References Cited
UNITED STATES PATENTS

| | | | |
|---|---|---|---|
| 2,624,485 | 1/1953 | Boston | 215—11 |
| 2,775,240 | 12/1956 | Morrisey | 128—214 |
| 2,876,768 | 3/1956 | Schultz | 222—386.5 X |
| 3,161,311 | 12/1964 | Boston | 215—11 |
| 3,203,569 | 8/1965 | Shomock | 215—11 |
| 3,292,809 | 12/1966 | Shomock | 215—11 |

GEORGE E. LOWRANCE, Primary Examiner

U.S. Cl. X.R.

128—214, 252